3,660,335
PETROLEUM WAX BLENDS
Charles D. Mason, Florham Park, and Julius P. Rakus, Basking Ridge, N.J., assignors to Allied Chemical Corporation, New York, N.Y.
No Drawing. Filed June 21, 1966, Ser. No. 559,113
Int. Cl. C08f 45/52
U.S. Cl. 260—28.5       1 Claim

ABSTRACT OF THE DISCLOSURE

Blends of petroleum wax with (1) from 1 to 20 wt. percent of polybutene-1 having an average molecular weight of about 50,000 to 1,000,000 and an isotactic content of about 50 to 98 wt. percent, and (2) from 1 to 20 wt. percent of an ethylene/vinyl acetate copolymer containing from about 10 to 40 wt. percent vinyl acetate have improved tensile strength, hardness, softening points and gloss, without markedly increased viscosity or shrinkage, and have cloud points not appreciably higher than that of the petroleum wax constituent. These blends are particularly useful as coatings for paper, paperboard and the like.

---

This invention relates to improved petroleum wax compositions, and more particularly to compositions consisting essentially of petroleum wax, highly isotactic polybutene-1 resin and copolymers of ethylene and vinyl acetate.

Petroleum wax, also called paraffin wax, melting within the range of from about 50° to 68° C., is widely used as a coating for wrapping paper and paperboard in the production of low-cost cartons for liquids. Petroleum wax, however, is not entirely satisfactory as it has many inherently undesirable properties, such as poor tensile strength, low hardness, low softening point, and low gloss. There has been a continuing interest in improving these properties and while a number of additives have been found to improve various individual properties, it has heretofore not been possible to improve these properties simultaneously.

Accordingly, it is an object of this invention to provide novel petroleum wax compositions having improved properties which compositions are particularly useful as coatings for paper, paperboard and the like.

It is another object of this invention to provide novel petroleum wax compositions having improved tensile strength, hardness, softening points and gloss, without markedly increased viscosity or shrinkage and having cloud points not appreciably higher than that of the petroleum wax constituent of such compositions.

We have found that these and other objects are achieved by the compositions of this invention. The compositions of this invention contain as essential constituents (A) from about 60 to 98 parts of petroleum wax, (B) from about 1 to 20 parts of polybutene-1 resin having a viscosity average molecular weight of from about 50,000 to 1,000,000 and an isotactic content of from about 50% to 98% by weight, and (C) from about 1 to 20 parts of a copolymer of ethylene and vinyl acetate, said copolymer having a vinyl acetate content of from about 10% to 40% by weight. Preferred compositions of this invention consist essentially of (A) from about 70 to 90 parts of petroleum wax, (B) from about 5 to 15 parts of poly-butene-1 resin having a viscosity average molecular weight of from about 100,000 to 500,000 and an isotactic content of from about 85% to 98% by weight, and (C) from about 5 to 15 parts of a copolymer of ethylene and vinyl acetate, said copolymer having a vinyl acetate content of from about 12% to 33% by weight.

Isotactic polybutene-1 resins are of relatively recent origin, being unavailable before about 1955. They are highly crystalline and are quite distinct from the amorphous, rubbery butene polymers which are well known in the art.

The expression "isotactic" is used herein in its conventional sense to mean the material in the polymer remaining after exhaustive extraction with diethyl ether; the isotactic material is substantially insoluble in this solvent. The diethyl ether extraction removes the amorphous or atactic material and leaves a polymer containing the isotactic material.

The isotactic polybutene-1 resins employed in this invention can be prepared by polymerizing butene-1 using a so-called "Ziegler-type" catalyst and conducting the polymerization under conditions to produce a polymer having the desired isotactic content of at least 50% and desired viscosity average molecular weight of at least 50,000. Any of the known Ziegler catalyst can be used; for example, catalysts obtained by reaction between compounds of metals of Group IV–A (titanium, zirconium or hafnium), V–A (vanadium, columbium or tantalum), VI–A (chromium, molybdenum or tungsten) with alkyl compounds of aluminum or a metal of Group II (beryllium, magnesium, calcium, strontium, barium, zinc or cadmium). The polymerization can be timed and moderated to produce isotactic polybutene-1 resins having the desired molecular weight and isotactic content. Hydrogen can be introduced into the polymerization reaction mixture to control the molecular weight and percent isotacticity.

As an alternative to the direct polymerization of the starting butene-1, degradation of higher molecular weight polybutene-1 resin to a desired starting molecular weight resin having an isotactic content in excess of 50% by weight can be employed. Such degradation may be catalytic, thermocatalytic or thermal. One example of such degradation is disclosed in U.S. Pat. 3,198,779 issued Aug. 3, 1965. The degraded polybutene-1 resins of the same molecular weight as the directly polymerized butene-1 resin gives blends of lower melt viscosities. Hence where blends having such lower melt viscosities are desired, it is preferred to employ degraded polybutene-1 resins.

The method of preparation of ethylene-vinyl acetate copolymers of this invention is well known in the art. The copolymers may be prepared by copolymerizing a mixture of ethylene and vinyl acetate in the presence of a catalyst, such as oxygen or an organic peroxide, for example, t-butyl hydroperoxide, at pressures ranging between about 100 and 200 atmospheres at a temperature ranging between about 150° C. and 250° C. and then separating the resultant copolymer from unreacted monomers by flashing off the unreacted monomers.

The blending of the polybutene-1 resins and the copolymers of ethylene and vinyl acetate of this invention with the paraffin wax can be effected in any known or desired manner. A typical procedure for effecting such blending is described below.

A three necked flask equipped with an electric drive stirrer, a thermometer, and a nitrogen inlet tube is charged with a measured amount of paraffin wax. The wax is heated under nitrogen with moderate stirring until a clear liquid results. To the melted wax is added a charge of copolymer and polybutene-1 in amounts herein disclosed. The mixture is heated to about 140 to 150° C. and stirred to assist solution. The mixture can be maintained under a continuous blanket of nitrogen during the heating and stirring, if desired, and particularly when the heating is carried out under higher temperatures than 150° C. Such blanket is not necessary when operating at 140 to 150° C. The resin and copolymer charge is completely dissolved in the wax in approximately one-half hour; this is evident upon visual inspection. Desirably, however, heating of the blend is continued for an additional one-quarter hour to insure complete dissolution of the resin and copolymer in the wax. The blend is thereupon allowed to cool to ambient temperature.

Tests were carried out on petroleum wax blends of this invention, as well as blends not within the scope of this invention for purposes of comparison. The tests are described below to illustrate this invention.

All parts and percentages are by weight unless specified otherwise.

The petroleum wax used in the tests was Paraffin 1116, hereinafter referred to as petroleum wax, which is supplied by Atlantic Refining Company.

The isotactic polybutene-1 resins used in the tests are described below:

Polybutene I—viscosity average molecular weight of 515,000 and isotactic content of 80%;
Polybutene II—viscosity average molecular weight of 160,000 and isotactic content of 91%;
Polybutene III—viscosity average molecular weight of 94,000 and isotactic content of 85%;
Polybutene IV—viscosity average molecular weight of 143,000 and isotactic content of 93%;
Polybutene V—viscosity average molecular weight of 54,000 and isotactic content of 90%.

The copolymers of ethylene and vinyl acetate, hereinafter referred to as EVA, used in the tests are described below.

Copolymer I is an EVA viscosity average molecular weight of about 2,000, and a vinyl acetate content of about 12%.

Copolymer II is an EVA; "Elvax" 220, supplied by E. I. du Pont de Nemours & Co., Inc., having a vinyl acetate content of 27 to 29%, and melt index of 125 to 175.

Copolymer III is an EVA; "Elvax" 150, supplied by E. I. du Pont de Nemours & Co., Inc., having a vinyl acetate content of about 32 to 34%, and melt index of 22 to 28.

Copolymer IV is an EVA; "Elvax" 240, supplied by E. I. du Pont de Nemours & Co., Inc., having a vinyl acetate content of about 27 to 29%, and melt index of 22 to 28.

The petroleum wax blends were prepared in a manner similar to that described above.

Molecular weight values were determined by solution-viscosity measurements (see W. R. Krigbaum et al., J. Phys. Chemistry, vol. 65, p. 1984 (1961). Melt viscosities were obtained at 100° C. using a No. 2 spindle at 20 r.p.m. with a Brookfield viscometer. Hardness values were obtained using a penetrometer according to ASTM-D-1321-57T, using a standard needle and a weight of 100 grams for 5 seconds at 77° F. Ring and ball softening points were obtained according to ASTM-E-D1320. Cloud points of the blends were determined by melting a 50 gram sample in a 100 ml. beaker with stirring and heated to 121° C.; and allowing the blend to cool slowly without agitation. The temperature at which a faint cloud develops in the wax is recorded as the cloud point.

TABLE I.—PART A

| Test number | 1 | 2 | 3 | 4 |
|---|---|---|---|---|
| Component parts: | | | | |
| Petroleum wax | 100 | 80 | 80 | 80 |
| Polybutene I | | 20 | | 10 |
| Copolymer I | | | 20 | 10 |
| Tensile strength (in p.s.i.) [1] | 220 | 328 | 312 | 532 |

TABLE I.—PART B

| Test number | 5 | 3 | 6 |
|---|---|---|---|
| Component, parts: | | | |
| Petroleum wax | 80 | 80 | 80 |
| Polybutene II | 20 | | 10 |
| Copolymer I | | 20 | 10 |
| Tensile strength (in p.s.i.) | 290 | 312 | 436 |

TABLE I.—PART C

| Test number | 7 | 3 | 8 |
|---|---|---|---|
| Component, parts: | | | |
| Petroleum wax | 80 | 80 | 80 |
| Polybutene III | 20 | | 10 |
| Copolymer I | | 20 | 10 |
| Tensile strength (in p.s.i.) | 359 | 312 | 452 |

TABLE I.—PART D

| Test number | 7 | 9 | 10 |
|---|---|---|---|
| Component, parts: | | | |
| Petroleum wax | 80 | 80 | 80 |
| Polybutene III | 20 | | 10 |
| Copolymer II | | 20 | 10 |
| Tensile strength (in p.s.i.) | 359 | 415 | 489 |

[1] On annealed samples according to ASTM-D-1320.

TABLE II.—PART A

| Test number | 11 | 12 | 13 | 14 |
|---|---|---|---|---|
| Component, parts: | | | | |
| Petroleum wax | 100 | 90 | 80 | 80 |
| Polybutene IV | | | | 10 |
| Copolymer III | | 10 | 20 | 10 |
| Cloud point, ° C | 62.5 | 88 | 84 | 80 |
| Hardness | 9.0 | 7.5 | 5.8 | 4.7 |
| Softening point, ° C | 58 | 63.1 | 64.2 | 78 |
| Viscosity (in cps.) | 15 | 48 | 329 | 260 |

TABLE II.—PART B

| Test number | 15 | 16 | 17 |
|---|---|---|---|
| Component, parts: | | | |
| Petroleum wax | 90 | 80 | 80 |
| Polybutene IV | | | 10 |
| Copolymer IV | 10 | 20 | 10 |
| Cloud point, ° C | 64.5 | 64 | 61.5 |
| Hardness | 8.2 | 7.9 | 4.5 |
| Softening point, ° C | 63.7 | 64.3 | 79 |
| Viscosity (in cps.) | 50 | 380 | 284 |

TABLE III.—COMPATABILITY—CLOUD POINT TESTS

| Test number | 11 | 18 | 19 | 20 | 21 |
|---|---|---|---|---|---|
| Component parts: | | | | | |
| Petroleum wax | 100 | 80 | 80 | 80 | 80 |
| Polybutene V | | | 5 | 10 | 15 |
| Copolymer I | | 20 | 10 | 10 | 5 |
| Cloud point, ° C | 62.5 | 68.0 | 68.0 | 66.0 | 64.5 |

The foregoing test results illustrate that the petroleum wax-polybutene-1 resin-EVA blends of this invention are superior to petroleum wax-polybutene-1 resin blends or petroleum wax-EVA blends, in tensile strength, hardness and softening point. The tests also illustrate that a petroleum wax containing a given level of polybutene-1 resin plus EVA, of this invention, has in addition to the above-mentioned properties an advantageously lower cloud point and a lower viscosity than a petroleum wax containing the same level of EVA alone.

In carrying out the tests it was noted that the compositions of this invention showed advantageously less shrinkage on solidification than the blends containing either polybutene-1 resin or EVA alone. It was further noted that the compositions of this invention had gloss comparable to that of petroleum wax-polybutene-1 resin blends and highly superior to that of petroleum wax-EVA blends.

Small amounts, e.g. up to about 5%, of additives commonly used in the wax art, e.g. antioxidants, can advantageously be incorporated in the compositions of this invention.

We claim:
1. A petroleum wax blend containing as its essential constituents
   (A) from about 70 to 90 parts of petroleum wax,
   (B) from about 5 to 15 parts of polybutene-1 resin having a viscosity average molecular weight of from about 100,000 to 500,000 and an isotactic content of from about 85% to 98% by weight, and
   (C) from about 5 to 15 parts of a copolymer of ethylene and vinyl acetate, said copolymer having a vinyl acetate content of from about 12% to 33% by weight.

References Cited

UNITED STATES PATENTS

| | | | |
|---|---|---|---|
| 2,877,196 | 3/1959 | Reding | 260—28.5 AV |
| 3,321,427 | 5/1967 | Tyran | 260—28.5 |
| 3,326,834 | 6/1967 | Signorelli et al. | 260—28.5 |
| 3,326,835 | 6/1967 | Signorelli et al. | 260—28.5 |
| 3,338,855 | 8/1967 | Kray | 260—28.5 |

MORRIS LIEBMAN, Primary Examiner

P. R. MICHL, Assistant Examiner

U.S. Cl. X.R.

117—155 UA